United States Patent [19]

Tchernev

[11] Patent Number: 4,556,049
[45] Date of Patent: Dec. 3, 1985

[54] INTEGRATED SOLAR COLLECTOR

[76] Inventor: Dimiter I. Tchernev, 9 Woodman Rd., Chestnut Hill, Mass. 02167

[21] Appl. No.: 267,074

[22] Filed: May 26, 1981

Related U.S. Application Data

[60] Continuation-in-part of Ser. No. 11,689, Feb. 12, 1979, which is a continuation-in-part of Ser. No. 710,609, Aug. 2, 1976, Pat. No. 4,138,850, which is a division of Ser. No. 520,808, Nov. 2, 1974, Pat. No. 4,034,569.

[51] Int. Cl.$^4$ ................................................ F24J 3/02
[52] U.S. Cl. .................................. 126/429; 62/235.1; 126/449
[58] Field of Search ............... 62/235.1; 126/429, 430, 126/433, 436, 449

[56] References Cited

U.S. PATENT DOCUMENTS

| | | | |
|---|---|---|---|
| 3,018,087 | 4/1958 | Steele | 257/1 |
| 4,018,211 | 4/1977 | Barr | 126/429 X |
| 4,030,312 | 6/1977 | Wallin et al. | 62/2 |
| 4,043,318 | 8/1977 | Pei | 236/271 |
| 4,049,046 | 9/1977 | Worthington | 165/18 |
| 4,074,705 | 2/1978 | Robinson, Jr. et al. | 126/271 |
| 4,081,024 | 3/1978 | Rush | 62/235.1 |
| 4,121,428 | 10/1978 | Glenn et al. | 62/235.1 |
| 4,135,371 | 1/1979 | Kesselring et al. | 62/477 |
| 4,138,850 | 2/1979 | Tchernev | 62/235.1 X |
| 4,165,952 | 8/1979 | Bennett | 62/235.1 X |
| 4,184,338 | 1/1980 | Bennett | 62/235.1 |
| 4,187,688 | 2/1980 | Berg | 62/2 |
| 4,203,422 | 5/1980 | Bottum | 126/417 |
| 4,206,745 | 6/1980 | Gilgen | 126/271 |
| 4,269,170 | 5/1981 | Guerra | 126/449 X |
| 4,334,524 | 6/1982 | McCullough et al. | 126/449 |

Primary Examiner—Lloyd L. King
Attorney, Agent, or Firm—Pravel, Gambrell, Hewitt & Kimball

[57] ABSTRACT

A solar collector having a copper panel in a contiguous space relationship with a condenser-evaporator heat exchanger located under the panel, the panel having a honeycomb-like structure on its interior defining individual cells which are filled with zeolite loaded, in its adsorbed condition, with 18 to 20% by weight of water. The interior of the panel and heat exchanger are maintained at subatmospheric pressure of about 0.1 to 1 psia. The panel and heat exchanger are insulated on their lateral sides and bottoms and on the top of the heat exchange. The panel has a black coating on its top which is exposed to and absorbs solar energy. Surrounding the insulation (which supports the panel) is an extruded aluminum framework which supports a pair of spaced-apart glass panels above the solar panel. Water in conduits from a system for heating or cooling or both is connected to flow into an inlet and discharge from outlet of a finned coil received within the heat exchanger. The collector panel provides heat during the day through desorption and condensing of water vapor from the heated solar panel in the heat exchanger and cools at night by the re-adsorption of the water vapor from the heat exchanger which lowers the absolute pressure within the system and cools the heat exchange coils by evaporation.

15 Claims, 5 Drawing Figures

INTEGRATED SOLAR COLLECTOR

RIGHT OF THE GOVERNMENT

The Government of the United States has certain rights in this invention pursuant to and as set forth in Contract No. DE-AC03-78CS32117 awarded by the Department of Energy.

RELATED APPLICATIONS

This is a continuation-in-part application of Ser. No. 11,689, filed Feb. 12, 1979, which is a continuation-in-part application of application Ser. No. 710,609, filed Aug. 2, 1976, U.S. Pat. No. 4,138,850 of Feb. 13, 1979 which is a divisional application of application Ser. No. 520,808, filed Nov. 2, 1974, U.S. Pat. No. 4,034,569 of Jul. 12, 1977.

BACKGROUND OF THE INVENTION

The present invention relates to an apparatus for the conversion of solar energy for heating and cooling by taking advantage of the large variation of the sorption capacity of molecular sieve zeolite. In particular, the apparatus relates to an integrated solar collector which includes a contiguous hermetically sealed zeolite panel and combined evaporator-condenser heat exchanger which converts small variations in absolute temperature of a water refrigerant under partial vacuum to relatively large variations in vapor pressure which, in turn, is utilized to produce cooling and refrigeration.

One of the primary difficulties which hinders use of solar energy for heat and cooling purposes is its low energy density (less than 1.5 kilowatt per square meter). The temperature differentials obtained with solar energy collectors are small and even when solar concentrators are used, temperatures above 400°–600° F. require sophisticated sun-following techniques. Thus, a need exists for apparatus which will efficiently convert solar energy to other forms of energy at small temperature differentials of, say between 50°–180° F. It has been found the unique characteristics of zeolites permit the design of such systems, especially to satisfy the needs for home heating, cooling and air-conditioning. The output of such systems increases as the solar load increases and therefore the higher needs for heating and cooling automatically are met by the higher output of such systems.

Those skilled in the art understand that due to the low temperature differentials obtainable with solar energy, Carnot efficiency of any system using the normal expansion of gases is of necessity quite low. For this reason, most solar energy refrigeration systems have concentrated on the known, dependable absorption refrigeration cycle based on the change of the solubility of a gas in a liquid with temperature. Inasmuch as this process is thermally activated, its dependence on temperature is exponential which permits large changes of gas pressure for small changes in absolute temperature. This process has received new impetus by commercial use of systems other than the ammonia-water used in early gas refrigerators. For example, at Kennedy Airport, New York City, an air conditioning system is provided which utilizes lithium bromide and water as working fluids.

In all refrigeration solid adsorption systems which have operated successfully, the heat source, supplied usually by a gas flame or steam, has been about 300° F. Although such systems operate efficiently and with adequate capacity, none has achieved commercial importance. In contrast, solar heat from flat plate collectors rarely exceeds 190° F. and the heat collection efficiency of the collectors is much higher at lower temperatures of 120° to 140° F. Due to the lower range temperature involved and, in particular, the reduced heat available from solar energy as a heat source, concentrated research and development efforts in the last few years, funded both by the Government and private industry, have failed to produce a cooling system which holds commercial promise. For example, modification of a Lithium Bromide system for solar energy has resulted in a drastically reduced capacity and low efficiency, requiring 80° F. water cooler condensers. When the condenser temperature raises to 120° F., as is necessary for air cooled condensers, a driving temperature at 140° to 160° F., which is reasonably obtainable from flat plate collectors, is insufficient for the system to operate.

Molecular sieve zeolites are a class of synthetic or natural mineral materials which have unique, non-linear adsorption properties described by exponentials to the second, third and fourth power in temperature and pressure. Zeolites have been found uniquely capable of converting small temperature differences into very large pressure differentials which can be practically utilized for both heating and cooling cycles. Zeolites also lend themselves to unique designs which utilize solid materials and diffusion through them to produce a solar refrigeration system of high conversion efficiency without moving parts which is, therefore, capable of long life and reliability.

Zeolites at room temperature absorb large quantities (up to 40% by weight) of any polar gas, that is gas with dipolar or quadropolar moment, such as $H_2O$, $NH_3$, $H_2S$, $N_2$, $CO_2$, etc., as well as both fluoro-, chloro- and hydrocarbons. Due to the high non-linearity of their adsorption properties, zeolites adsorb large quantities of such polar gases when heated to temperatures which are easily achieved by flat plate solar collectors.

In practice, it was found that water vapor which was equiliberated at room temperature and had a partial pressure of 0.05 psia would have a pressure of 1.5 psia at 120° F. Further, this temperature was sufficient to cause some water vapor to be desorbed from the zeolite and also condensed in a condenser held at 120° F. By increasing the zeolite temperature to 140° F., up to 10% by weight of the water vapor can be desorbed from the zeolite.

In contrast, other solid adsorbents such as silica gel, activated alumina and activated carbon adsorb much smaller quantities of such gases under the same conditions and desorb even less when heated to the 160° to 200° F. range. Thus, the resulting pressures are much smaller and the quantities of gas desorbed at high pressures are negligibly small. It has been found that liquid-gas systems suffer from the same shortcomings and do not operate efficiently, if they operate at all, at such low temperatures and high pressures. This is confirmed when driven by 140° to 160° F. with an air cooled condenser of 100° to 120° F.

In theory, the amount of adsorbed gas in a molecular sieve zeolite is represented by the equation $$a = a_{o2}\theta_2 + a_{on}\theta_n$$

where $a_o$ is the limiting adsorption value of the gas and $\theta_n = \exp\text{-}[(RT\ln(p_s/p)/E_n]^n$ and n is an integer between 2 and 5. R is the universal gas constant; $p_s$ is the limiting saturation pressure; p is the actual pressure; and $E_n$ is the activation energy, which is on the order of a few kilocalories per mole. In this connection, reference is made to M. Dubin and V. Astakhov, "Description of Adsorption Equilibria of Vapors on Zeolites Over Wide Ranges of Temperature and Pressure," *Second International Conference on Molecular Sieve Zeolites*, Sept. 8–11, 1970, Worcester Polytechnic Institute, Worcester, Mass., pp. 155–166.

In view of the foregoing, it will be understood the adsorption process in molecular sieve zeolites is extremely temperature sensitive within a rather narrow range of temperature which is not far above room temperature. Also, zeolites are chemically inert, abundant and inexpensive.

A norm for solar energy collectors is the flat plate collector which has been known for many years. Such collectors are typically well-insulated and have a metal plate painted or plated with black which receives the solar radiation whereby about 90% of such radiation is absorbed and converted to heat. Due to the area available for solar collectors and necessary economies, the efficiency of a collector using adsorption for heating and cooling purposes should not be significantly greater or less efficient than a flat plate solar collector and its cost should not exceed that of a flat plate solar collector by an amount which exceeds the value of the cooling obtained.

For specific prior patents which disclose the state of the art, attention is invited to the following U.S. patents:

| | | |
|---|---|---|
| 2,221,971 | Haywood | Nov. 19, 1940 |
| 2,293,556 | Newton | Aug. 18, 1942 |
| 3,043,112 | Head | Jul. 10, 1962 |
| 3,018,087 | Steele | Jan. 23, 1962 |
| 3,242,679 | Puckett et al | Mar. 29, 1966 |
| 3,270,512 | Webb | Sep. 6, 1966 |
| 3,621,665 | Mokadam | Nov. 23, 1971 |
| 3,984,050 | Gustofsson | Oct. 5, 1976 |
| 4,007,776 | Alkasah | Feb. 15, 1977 |
| 4,011,731 | Meckler | Mar. 15, 1977 |
| 4,016,860 | Moan | Apr. 12, 1977 |
| 4,018,215 | Pei | Apr. 19, 1977 |
| 4,023,375 | Chinnappa et al | May. 17, 1977 |
| 4,028,904 | Anderson | Jun. 14, 1977 |
| 4,029,080 | Warren | Jun. 14, 1977 |
| 4,030,312 | Wallin et al | Jun. 21, 1977 |
| 4,043,318 | Pei | Aug. 23, 1977 |
| 4,044,819 | Cottingham | Aug. 30, 1977 |
| 4,049,318 | Worthington | Sep. 20, 1977 |
| 4,068,652 | Worthington | Jan. 17, 1978 |
| 4,070,870 | Bahel et al | Jan. 21, 1978 |
| 4,074,705 | Robinson et al | Feb. 21, 1978 |
| 4,081,024 | Rush et al | Mar. 28, 1978 |
| 4,116,222 | Seifried | Sep. 26, 1978 |
| 4,135,371 | Kesseling | Jan. 23, 1979 |
| 4,165,952 | Bennett | Aug. 28, 1979 |
| 4,187,688 | Berg | Feb. 12, 1980 |
| 4,231,772 | Berg | Nov. 4, 1980 |

SUMMARY OF THE INVENTION

An object of the instant invention is to employ solar energy through utilization of molecular sieve zeolites as a solid adsorption material to produce reasonably large pressure differentials at small temperature differences. This is accomplished due to the extremely strong temperature dependence (theoretically exponential up to the fifth power of the temperature as noted above) of gas sorption and desorption on certain materials such as exist in the molecular sieve zeolite family. The large pressure differential is used in the construction of solar energy heating and cooling apparatus utilizing zeolite.

Because of this extremely strong temperature dependence, a change in temperature from 75°–212° F. can cause an increase of pressure as high as an order of magnitude of ten or higher.

The apparatus of the invention comprises panels filled with zeolite as the adsorbent material which is saturated at ambient temperatures with water vapor at subatmospheric pressure as the working gas. When the panels are heated by solar heat, they desorb the water vapor, the pressure increases and the subsequent condensation of the vapor into water produces the desired heating effect which takes place in a heat exchange chambers located under the panels and in contiguous vapor passage communication therewith. During night when the panels cool by radiation, they may be recharged to saturation again by vapor which evaporates from their respective heat exchange chambers to produce a reduced pressure within the system which causes cooling and the panels, now saturated with water vapor, are ready for a new cycle during the following day.

Thus the system takes advantage of day-to-night variation and solar insolation to achieve vapor pumping action without the use of mechanical compressors or other moving parts. During the day cycle, a zeolite collector panel, its surface coated with a black absorber, is heated by the sun. The heated zeolite desorbs water vapor that had been adsorbed during the night. The desorbed vapor is then condensed, liberating its latent heat of vaporization, and received and stored as a liquid condensate in the space receiving a heat exchanger. During this cycle, such space operates as a condenser and its operating temperature determines the water vapor pressure in the system which is about one psia for a condenser temperature of 100° F. During night, the zeolite cools and reabsorbs water vapor. By the reabsorption of vapor, the pressure in the system reduces to about 0.1 psia wherein evaporation occurs at about 35° F. and the space now acts as an evaporator cooling fluid which passes in coils through the space. Readsorption of the vapor generates a low-grade heat in the zeolite which is continuously rejected to the atmosphere.

With the operating pressure of the zeolite collector changing from about 1 psia during the day to 0.1 psia during the night, the system performs in a manner similar to a one cycle per day compressor with a ten to one compression ratio. It can, as a heat pump, be used for both heating and cooling with heat from the condensing action providing domestic hot water throughout the year. During the heating season, such heat may also be used to produce hot water for space heating with excess hot water being stored for use during the night and for cloudy days. In the cooling season, heat from the condensing action which is not needed for domestic hot water can be transferred to the atmosphere.

Because a system in accordance with the invention can be used for both heating and cooling, there is a shorter period of repayment of capital costs than with a single application system, making the combined system more attractive to potential users.

The instant invention is directed to a solar collector which utilizes a zeolite adsorption system which can be used for both heating and cooling which will provide a shorter period for repayment of capital costs than a single application system, with the condensor and evaporator integrated with the zeolite panel as a heat exchanger system disposed to the rear of the panel.

Through this structure, the collector is assembled, tested, evacuated and sealed at the factory whereby it is unnecessary to make vacuum-tight joints at the construction site. Thus, the only connections needed at the construction site are regular plumbing joints to external liquid connections into the heat exchanger.

DESCRIPTION OF THE PREFERRED EMBODIMENT

Figure 1:
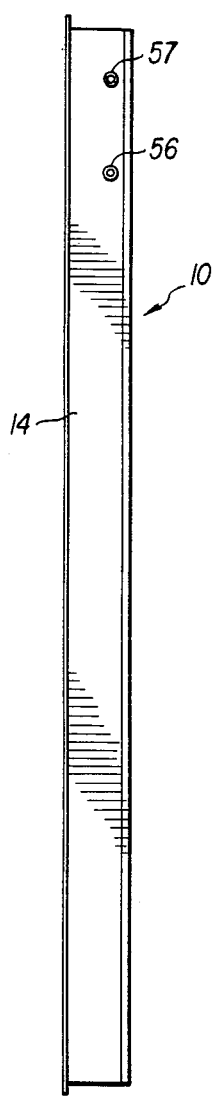
FIG. 1 is a side elevation view of a solar collector in accordance with the instant invention.
Figure 2:
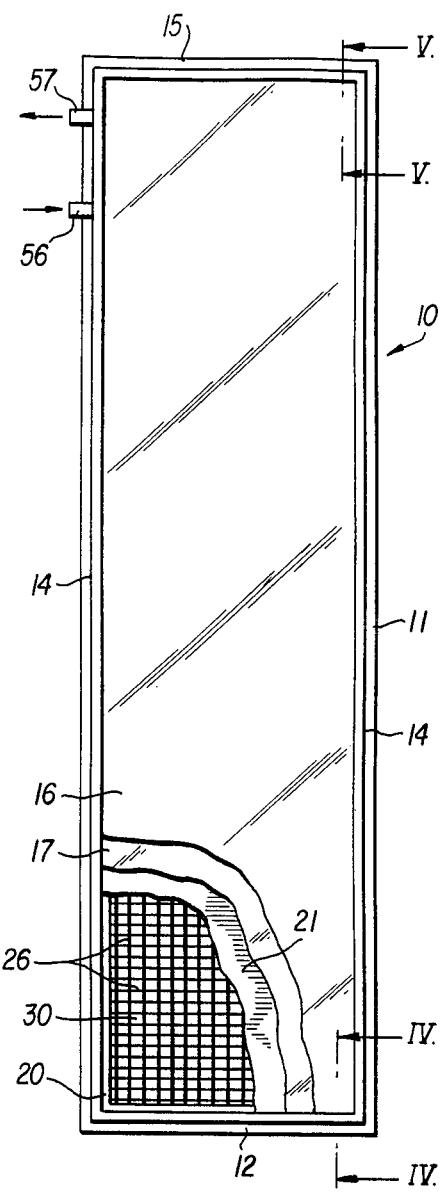
FIG. 2 is a plan view of a collector shown in FIG. 1 with a portion of the top broken away to reveal the interior structure.
Figure 4:
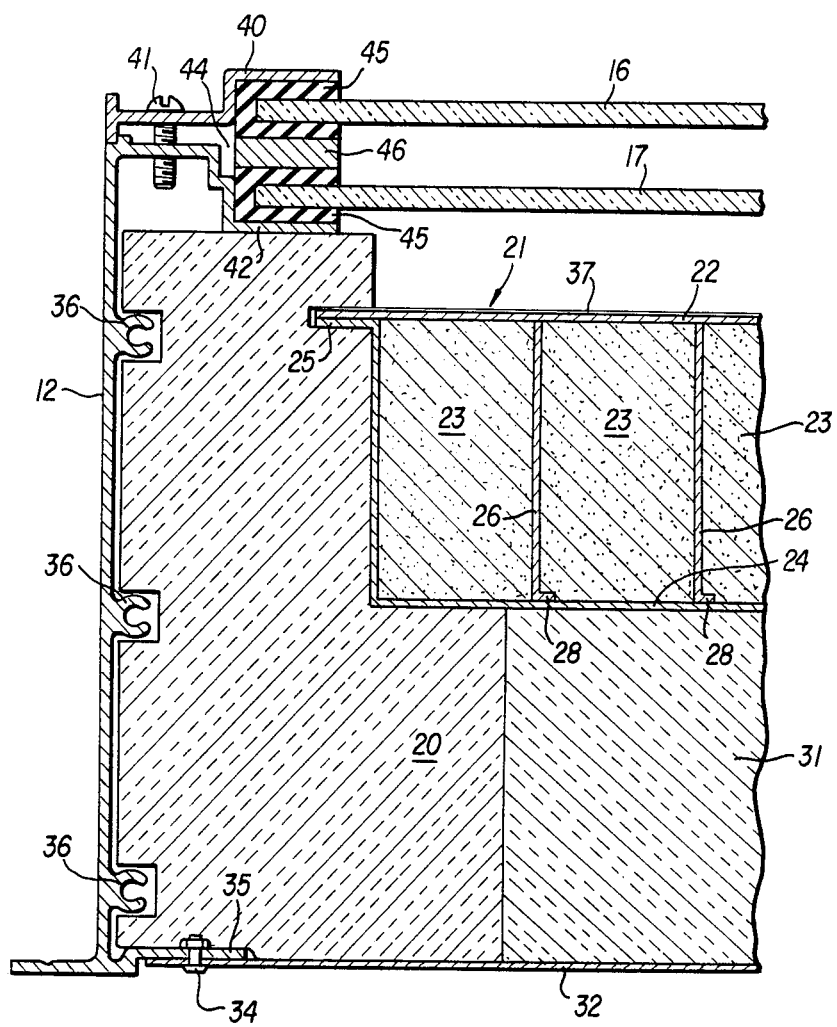
FIG. 4 is a sectional view taken on lines IV—IV of FIG. 2.
Figure 5:
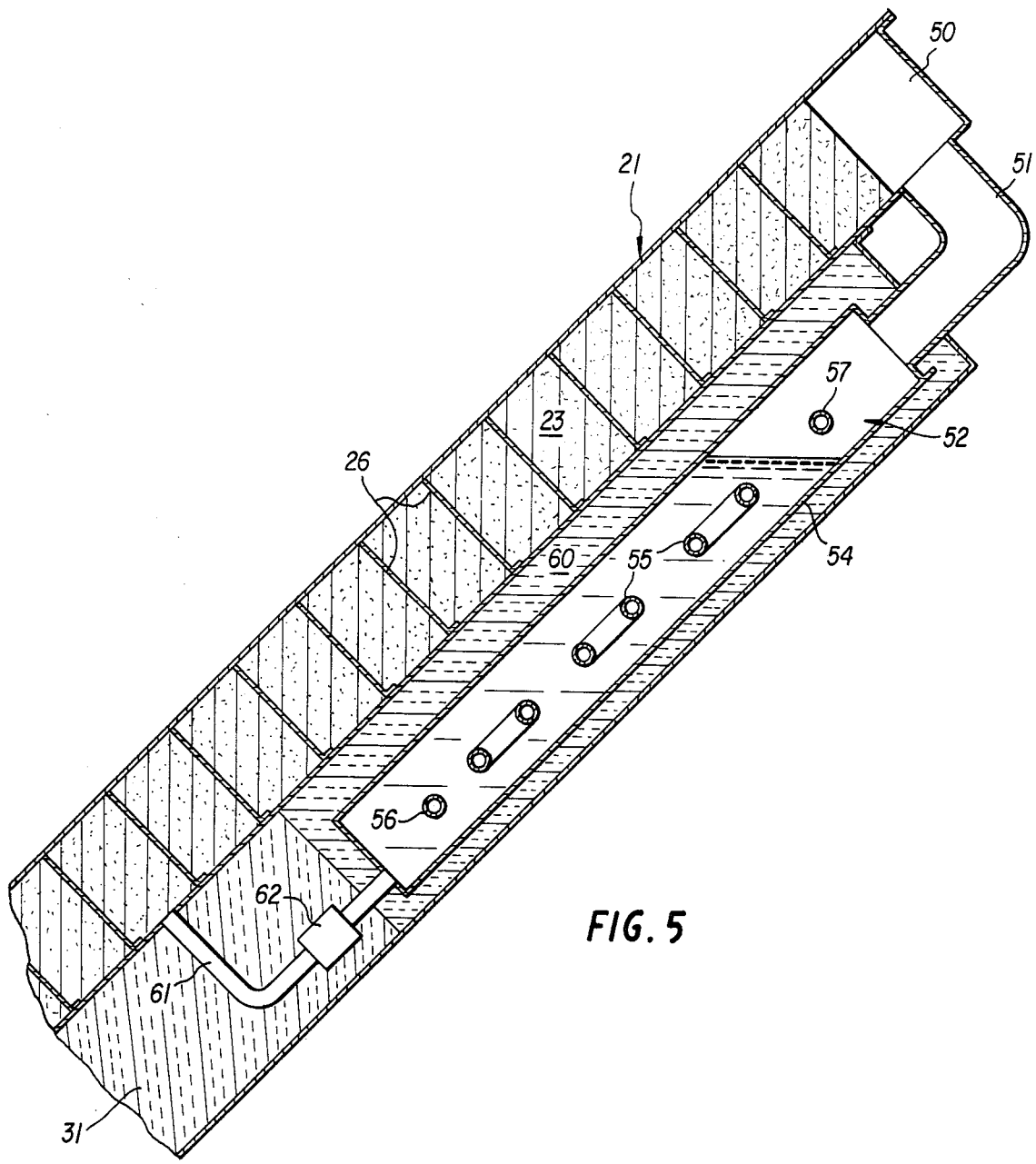
FIG. 5 is a further sectional view showing the arrangement of the panel and heat exchanger (with the framework omitted) taken on lines V—V of FIG. 2.

Referring to FIGS. 1, 2 and 4, the integrated collector 10 in accordance with the invention comprises a framework 11 of extruded aluminum which has lowermost front frame 12 side frames 14, and an uppermost rear frame 15.

Two parallel spaced-apart tempered glass panels 16 and 17 are supported in the upper aspect of framework 11.

Framework 11 is completely insulated on its interior by isocyanurate foam insulation 20. Such insulation has a sufficient structural load capacity to support the zeolite panel 21.

Each panel 21 comprises a copper cover member 22 and a copper pan member 24 which at its upper outer periphery has a flange or lip 25 to which the cover member 22 is secured and sealed during final assembly.

Figure 3:
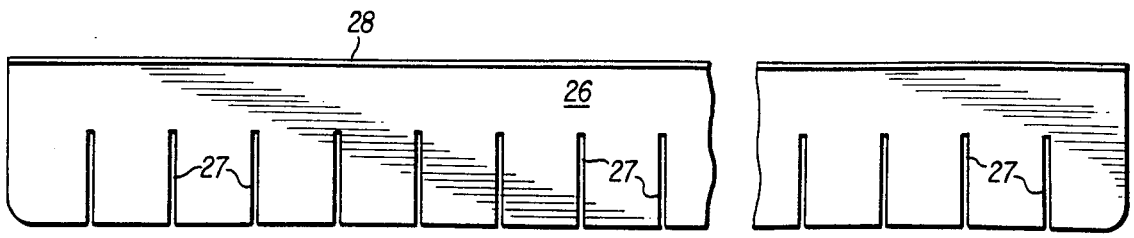
FIG. 3 is a partial detailed view of a copper separator.

On the interior of each panel 21 are a plurality of copper separators 26 of a type as shown in FIG. 3. Each separator 26 has a plurality of slots 27 and a one quarter inch bend 28 along one edge to provide rigidity and strength.

As seen best in FIG. 2, separators 26 extend lengthwise and across the collector 10 to produce a honeycomb-like or egg-crate type core wherein the bends 28 on the lengthwise separators 26 are on top and, on transverse separators 26, on the bottom with slots 27 of the lengthwise separators receiving slots 27 of the transverse separators to produce the honeycomb-like structure wherein a plurality of cellular spaces 30 are produced.

Each cellular space 30 is filled to the top with zeolite powder 23 which has been mixed with water, the zeolite 23 being cast in each cell 30 and in panel 21 whereupon the water is driven out and the zeolite is dried in situ.

The bottom of panel 21 is insulated by a fiberglass mat 31.

Cover member 22 is coated with a black absorbent paint or coating 37.

A bottom plate 32, which is an aluminum sheet, is secured across the entire bottom of collector 10 by bolts 34 which connect it to an inwardly extending flange 35 extending from each frame 12, 14 and 15 of framework 11.

It will also be noted from FIG. 4 each frame 12, 14 and 15 has three spaced-apart stringers 36 which are extruded to receive metal self-tapping screws for securing the frames together.

Each frame 12, 14 and 15 includes an extruded aluminum retainer member 40 which is secured to the remainder of its respective frame by means of bolts 41. Each retainer member 40 together with an upwardly extending profile part 42 of frames 12, 14 and 15 define a space 44 which, as seen in plan, surrounds panel 21 above insulation 20 and receives a pair of rubber gaskets 45 which grasp and insulate the peripheries of glass panels 16 and 17. Gaskets 45 are spaced-apart by a rectangular frame member 46 which is preferably composed of a suitable insulating material.

It is important that water vapor be able to communicate with each cellular space 30 and this is accomplished by providing longitudinal grooves 18 in the underside of cover member 22 whereby each cellular space 30 has at least one groove communicating therewith. This can be accomplished by other means such as providing a series of small tubes with slots between cover member 22 and the tops of separators 26 to communicate with each cellular space 30.

The purpose of the grooves or slotted tubes or the like is to provide communications from the individual spaces 30 to a passage 50 provided at the upperside of panel 21 which in turn communicates via an elbow 51 with a heat exchanger 52.

Heat exchanger 52, which is the condenser evaporator combination of the apparatus, comprises a container 54 which receives elbow 51 and houses a finned coil 55 which is provided with an inlet 56 through the side of container 54 and an outlet 57 therefrom. Foam glass insulation 60 completely surrounds container 54.

At the bottom of container 54, tubing 61 provides a drain for condensate back into the zeolite panel 21, such tubing 61 containing a temperature sensitive valve 62 to provide the automatic draining of liquid from container 54 into panel 21 where it is adsorbed at temperatures below freezing. Such temperature sensitive valve 62 may, if desired, be replaced by manual valve, in which case it has to be opened manually in the late fall when no more cooling is required and closed again in the spring when there is no longer danger of the water freezing.

To provide adequate cooling at night, openings may be made in the frame 12 and the frame 15 which are connected to conduits and fans to provide for the circulation of air between cover member 22 and glass panels 17. In such case adequate passage for the air must also be provided through the adjacent insulation 20 to the front and rear frames 12 and 15.

In construction, the interior of the panel 21, the interior of container 54, elbow 51 and tubing 61 comprise a hermetically sealed contiguous space which, with water vapor adsorbed by the zeolite is placed under 0.1 psia and no other gases are present within the space except water vapor. All parts which define, or are within the contiguous space which is maintained at subatmospheric pressure, are composed of copper. In the embodiment shown, the zeolite loading is ten pounds per square foot of panel 21. However, for sunny desert climates, the zeolite loading may vary over a wide range from 7.5 to 25 pounds per square foot with minimal effect on the efficiency and performance of the system. However, in climates with a higher frequency of cloudy weather such as New England or the southeastern states, the zeolite loading is preferably between seven and ten pounds per square foot of zeolite which is considered the optimum value for good technical performance, low cost and weight.

It will be understood heating and cooling fluid, usually water, is provided a system through inlet 56 and outlet 57 and a description of such system, which is usually for a building, is not described. However, those skilled in the art will appreciate hot and cooling water or other fluids from such inlets and outlets can be advantageously utilized to heat domestic hot water, for heating or cooling air ducts and for heating or cooling stored water in a wide variety of heating and cooling systems.

In operation, with a 50° F. evaporator and 80° F. zeolite temperatures at the end of the adsorption cycle, with the collector 10 placed properly, facing south or otherwise to receive solar energy, no desorption occurs until the zeolite is heated to a temperature of 135° F. Adsorbed in the zeolite is about 18% to 20% by weight water. In fact, during this 55° F. range, that is from 80° F. to 135° F., zeolite in panel 21 absorbs 2,904 BTUs of heat before desorption commences.

Assuming an average collector efficiency of 70%, a total solar input of 4150 BTUs is thus required before desorption commences. Between 135° F. and 195° F., the zeolite desorbs five percent water vapor (as a percentage of the zeolite weight). This is eight pounds of water. The specific heat of the collector uses 3,168 BTUs in this range and the desorption energy is 8 times 1200 which equals 9600 BTUs for a total of 12,768 BTUs. Assuming a 50% collector efficiency in this 55° F. range, 25,535 BTUs of energy are required from the sun. Thus, the collector should have a 29,686 BTU input capacity. The input capacity for collector 10 is 31,000 to 32,000 BTUs with a 2,000 BTU per square foot day average input.

The cooling produced by the collector at night is 8,000 BTUs (8 pounds of water at 1,000 BTUs per pound) so the complete system efficiency is 8,000 BTUs divided by 29,685 or 26.95%.

In a test in June of 1979, the solar daily input rate on June 21 was 31,800 BTUs. The total heating output of the collector during the day was 7300 BTUs and the total cooling output during the following night was 7200 BTUs for a total conversion efficiency of 22.64%. This efficiency was subsequently improved to 25% by using low iron glass panels 16 and 17.

On clear sunny days with over 2,000 BTUs per square foot per day input, the cooling output of the collector is over 500 BTUs per square foot per day and the efficiency of the collector is 25 to 28%. On a 1,000 BTU per square foot per day solar input wherein there may be no sun at all in the morning and a cloudless afternoon, a relatively high output and efficiency results from the panel in accordance with the invention. On the other hand, with an overcast day where at any time the solar input is at one-half of the cloudless value, the same total input may be produced but with a much decreased output and efficiency.

The collector produces about the same amount of useable BTUs as regular flat bed collector in the heating mode. Generally on days with less than 400 BTUs per square foot per day solar input, no useful cooling or heating output can be observed. The efficiency increases to about 10% at 950 BTUs per square foot per day, 20% at 1500 BTUs per square foot per day and above 25% for inputs over 2,000 BTUs per square foot per day.

Panel 21 has an area of 25 by 91 inches or, in other words, 15.8 square feet. Container 54 is 24 inches by 13 inches by 1.5 inches for a total volume of 468 cubic inches. Finned coil 55 is a commercially available coil manufactured by Dunham-Bush Inc. and has dimensions of 23¼ inches by 12¼ inches by 1½ inches. Container 54 is designed to receive a maximum of 16 pounds of water which requires a volume of about 440 cubic inches. Tubing 61 is soft copper 3/16 inch tubing and elbow 51 is a 1⅛ copper coupling.

The adsorption cooling or coating 37 is preferably nextel black velvet paint or a chromium nickel film. Glass panels 16 and 17 are preferably Soltex etched tempered glass which are 27 inches by 93 inches by 5/32 inches in thickness.

The cost of producing a collector in accordance with the invention is roughly 1.25 times the cost of producing a comparable size regular flat bed solar collector.

Natural zeolites operate in the system more efficiently than synthetic zeolites. Of the various types of zeolites available, to date Chabazite has been found preferable. Such zeolite operates with overall engineering efficiencies above 25% under most weather conditions. Other natural zeolites perform in a similar fashion only with lower efficiencies. The next best choice for the application of the instant invention is Clinoptilolite. Other zeolites which are satisfactory but have been found less efficient are Mordenite and Erionite. With such zeolites, the maximum efficiency is about 25%. It should be pointed out, however, from experience gained in working with zeolites, important adsorption properties of the zeolites vary more between deposits of different locations than between zeolites of different crystal structures. In other words, good Clinoptilolite from a give deposit may operate more like a good Mordenite than like a bad Clinoptilolite from a different deposit location. It is theorized, therefore, the exact ion composition of a zeolite is more important in determining its water adsorption properties than its crystal structure and name. For this reason, it is recommended each deposit be individually tested for water vapor capacity and heat adsorption.

The drawings are of reasonable proportional accuracy. Thus, in the embodiment, the overall height of the collector is about 6.5 inches, insulation 20 is about three inches in horizontal thickness, the panel 21 has an interior height of two inches, the overall length of the collector at its bottom is 96¼ inches and at its top 95 inches, the effective width of the glass panel, as seen in FIG. 2, is 25¾ inches and its effective length is 91¾ inches. However, although the preferred embodiment of the invention has been described in detail, as will be understood by those skilled in the art, it is capable of other adaptations and modifications within the scope of the appended claims.

Having thus described my invention, what I claim as new and to be secured by Letters Patent of the United States is:

1. A solar collector panel which comprises: a first rigid sheet of impervious material; a second rigid sheet of impervious material spaced above and parallel to said first sheet; edge means connecting the peripheries of said sheets to form a hermetically sealed first space between said sheets; cellular means in said first space extending between said sheets and forming a plurality of cells therein; zeolite material filling said cells from said first sheet to proximate said second sheet; vapor passage means between said cells whereby gas and vapor in said first space can move between said cells to be desorbed and adsorbed by said zeolite material; a refrigerant in said space at a pressure less than atmospheric pressure; a container defining a sealed second space in vapor passage communication with said first space disposed under said first space for receiving gas and vapor desorbed by said zeolite material; heat exchange means in a heat exchange relationship with the interior of said second space for performing the function of condensing vapor or gas refrigerant received in said second space which has been desorbed from said zeolite material at a first temperature and evaporating said refrigerant condensate in said second space to be adsorbed by said zeolite material at a second temperature lower than said first temperature.

2. A solar collector panel in accordance with claim 1 wherein said refrigerant is water vapor.

3. A solar collector panel in accordance with claim 2 wherein said subatmospheric pressure in said first space when said refrigerant is adsorbed in said zeolite material is about 0.1 psia and when said refrigerant is desorbed from said zeolite material is about 1.0 psia.

4. A solar collector panel in accordance with claim 1 wherein said zeolite material is composed of natural zeolite.

5. A solar collector panel in accordance with claim 4 wherein said zeolite is Chabazite.

6. A solar collector panel in accordance with claim 1 in combination with a framework and spaced glass panels supported by said framework permitting solar energy to be received by the solar collector panel.

7. A solar collector panel in accordance with claim 1 wherein said second sheet is coated with an exterior black substance.

8. A solar collector in accordance with claim 1 wherein the distance between said first and said second sheet is about two inches.

9. A solar collector panel in accordance with claim 1 wherein said vapor passage means comprises grooves in the underside of said second sheet.

10. A solar collector panel in accordance with claim 1 wherein the volume of said second space is about 15% to 25% of the volume of said first space.

11. A solar collector panel in accordance with claim 1 wherein the amount of water in said zeolite material in its adsorbed condition is about 18% to 20% by weight of said zeolite material.

12. A solar collector panel in accordance with claim 1 wherein the difference between said first temperature and said second temperature is in the range of 50° to 100° F.

13. A solar, collector panel in accordance with claim 12 wherein said first temperature is in a range of 125° to 150° F.

14. A solar collector panel in accordance with claim 12 wherein said difference is about 50° to 60° F.

15. A solar collector panel in accordance with claim 1 wherein said second temperature is about 80° F. and said first temperature is about 135° F.

* * * * *